2,866,748

ALUMINUM CONTAINING REFORMING CATALYST

Morris Feller, Park Forest, Ill., assignor to Standard Oil Company, Chicago, Ill., a corporation of Indiana No Drawing. Application January 11, 1957
Serial No. 633,536

2 Claims. (Cl. 208—138)

This invention relates to platinum-alumina reforming catalyst and more particularly to a catalytic mixture of a platinum-alumina composite and aluminum metal and to hydrocarbon conversion processes using such catalytic mixture.

Alumina-supported platinum catalysts are now employed on a large scale in the conversion of hydrocarbons, particularly in the conversion of the low octane naphthas into gasolines of high anti-knock rating by means of the so-called "hydroforming" process. Because of the platinum content, the cost per pound of such catalysts is substantially higher than prior art catalyst used for similar purposes, e. g., molybdena-alumina reforming catalyst, silica-alumina cracking catalyst, and the like. Any technique for increasing the utility or effectiveness of platinum-alumina composites thus will have substantial economic benefits. It is therefore an object of the present invention to increase the effective activity of such catalysts per unit of platinum.

Products from hydroforming processes using platinum-alumina catalysts contain substantial aromatics, particularly at high reforming intensities. Such aromatics are used extensively, for example, in the petrochemical industry, where particular aromatic fractions are further processed. For such purpose it is desirable to maximize total aromatics in the hydroformate product, and, in particular, certain aromatic fractions, for example, benzene. It is, therefore, a further object of my invention to increase the aromatics content of hydroformate product and to selectively increase the production of benzene.

In the production of high octane reformates with platinum-alumina catalyst hot-spots or heat-fronts are often encountered in localized positions in the catalyst bed and also within individual catalyst pills, pellets, spheres, and the like. Such over-heating leads to excessive hydrocracking, coke formation, and conversion of the alumina from the active gamma and eta forms to the inactive alpha form. Any method which would improve the heat conductivity of the catalyst particles would thus minimize this problem of uneven heat distribution. It is therefore still another object of my invention to improve the heat conductivity of platinum-alumina catalyst. Other objects of my invention will be apparent from the following description thereof.

I have discovered that finely-divided aluminum metal admixed with a platinum-alumina composite results in a catalytic mixture of substantially superior activity per unit of platinum, of greater selectivity for the production of aromatics, including benzene, and of improved heat conductivity. I have found, for example, that a 1:1 mixture of aluminum and a 0.6 percent platinum-alumina composite has a higher activity than the composite itself, even though the total platinum used is cut in half. Moreover, the ratio of benzene to toluene production is substantially increased.

My catalyst consists essentially of alumina, about 0.01 to 1.0 weight percent, based on dry $Al_2O_3$, of platinum composited therewith, and about 10 to 90 percent by weight based on dry $Al_2O_3$, of free aluminum admixed with (physically dispersed throughout) the platinum-alumina composite. In preparing my catalyst, I mix finely-divided free aluminum metal, i. e., elemental aluminum, preferably of 99 percent purity or better, with a finely-divided platinum-alumina composite and thereby obtain a catalyst mixture of unexpected superiority. The free aluminum is added in amounts of about 10 to 90 percent by weight, based on dry $Al_2O_3$, preferably 30 to 70 percent. To obtain the desired intimate physical mixing of the free aluminum metal with the platinum-alumina composite, the aluminum and the platinum-alumina composite must each be finely divided or powdered for mixing. Thus, substantially all of the aluminum, i. e., 90 percent or more, should be sized to pass a 100 mesh ASTM sieve (A. S. T. M. designation E11–39, Part IIIA, pp. 730–36, 1946), or finer. Likewise, substantially all of the platinum-alumina composite, i. e., 90 percent or more, should be sized to pass a 30 mesh ASTM sieve, or finer.

As a safety precaution, care must be taken in preparing the finely-divided aluminum. The heat of combination of aluminum with oxygen is high. In finely-divided powder form, aluminum will burn in air, and, when dispersed in suitable concentration (above about 40 ounces per 1000 cubic feet), it forms an explosive mixture with air. However, when the oxygen concentration is reduced below about 10%, explosive mixtures are no longer formed.

The platinum-alumina composite may be any of a large variety suitable for the conversion of hydrocarbons. It may be prepared by compositing platinum with any of a large variety of available high-purity aluminas, such as alumina hydrosol, alumina hydrogel, alumina xerogel, alumina monohydrate, sintered alumina, and the like, all of which are readily prepared by methods described in the art. Dried alumina suitable for the present invention may be prepared by aging peptized alumina at a pH of about 8.5 to 12 to form solid, hydrous alumina, and thereafter separating and drying the alumina below 50 percent volatiles. The alumina should preferably be gamma-alumina and/or eta alumina, substantially free from contaminants such as iron, manganese, molybdenum, nickel, cobalt, sodium, other alkali metals, or compounds thereof. The alumina is commingled with platinum in the form of a platinum compound such as chloroplatinic acid, platinum tetrachloride, a platinum-amine complex, bromoplatinic acid, or the like, or a solution thereof, or preferably a stable colloidal suspension of a platinum sulfide, prepared, for example, by commingling aqueous ammonium polysulfide with aqueous chloroplatinic acid. The platinum is composited or incorporated in the alumina in a proportion between about 0.01 and 1 percent by weight, calculated as the metal on the basis of dry $Al_2O_3$, preferably between about 0.1 and 1 percent. To this may optionally be added another component as a cracking adjuvent, such a silica, a fluoride, a chloride, boria, chromia, an oxide of phosphorus, or the like, suitably in the proportion of about 0.1 to 10 percent by weight, based on dry $Al_2O_3$. The completed catalytic mixture is preferably dried at least in part at a temperature between about 200 and 400° F. for a period between about 4 to 24 hours. The resulting cake is then calcined at a temperature preferably between about 800 and 1200° F. for around 2 to 8 hours or more. The particular method of preparing the platinum-alumina composite is, of course, not a part of the present invention, so long as the finished composite is catalytically active for the conversion of hydrocarbons, and, in particular, for the hydroforming of petroleum naphthas.

After intimate mixing of the finely-divided aluminum and platinum-alumina composite, the catalytic mixture may be prepared in any desired mechanical form according to the specific process for which it is intended. I may, for example, employ the catalyst in the form of pills, pellets, spheres, granules, broken fragments, or various special shapes, dispersed as a fixed bed within a reaction zone, and the charging stock may be passed therethrough as a liquid, vapor, or mixed phase, and in either upward or downward flow. Alternatively, I may prepare the catalyst in a suitable form for use in moving beds, in which the charging stock and catalyst are ordinarily passed in parallel flow; or in fluidized-solid processes, in which the charging stock is passed upward through a turbulent bed of the finely divided catalytic catalyst; or in the suspensoid process, in which the catalyst is slurried in the charging stock and the resulting mixture is conveyed into the reaction zone. Fluidized operation with the catalyst mixture of the present invention may lead to problems of settling, classification, elutriation, and the like unless the relative particle sizes of the aluminum and platinum-alumina composite are carefully adjusted. The particular particle sizes are, of course, a function of the type of fluidized conversion process, gas velocities, and the like. The reaction products from any of the foregoing processes are separated from the catalyst, vented to atmospheric pressure, and fractionated to recover the various components thereof. Hydrogen and/or unconverted materials are recycled as desired.

My catalytic mixture is broadly useful in hydrocarbon-conversion reactions which are catalyzed by platinum. Specifically, my catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. In general, my improved catalytic mixture is suitable in the same applications and under substantially the same conditions as required for conventional platinum-alumina composites. As a specific embodiment, I prefer that my catalyst contain between about 30 and 70 percent by weight of free aluminum admixed with a platinum-alumina composite, containing between about 0.1 and 1.0 percent by weight of platinum, and that it be utilized for reforming a petroleum naphtha.

In utilizing my new catalyst for the reforming of a petroleum naphtha, a feed stock consisting essentially of a virgin naphtha, a cracked naphtha, or a mixture thereof, boiling within the range of about 70 to 500° F., and preferably within the range of about 150 to 400° F., is contacted in the vapor phase with the catalytic mixture at a liquid hourly space velocity between about 0.1 and 10 and a temperature within the range of about 800 to 1050° F., the average temperature throughout the catalyst bed being maintained within the range of about 875 to 950° F., preferably around 900° F. Hydrogen is added to the reaction zone at a rate between about 1000 and 10,000 standard cubic feet per barrel of charging stock. The process is ordinarily operated at a pressure within the range of about 100 to 1200 pounds per square inch.

My invention will be more fully understood from the following specific example:

*Example*

To illustrate the effectiveness of my catalytic mixture, particularly for production of aromatics and for obtaining a high ratio of benzene to toluene, two hydroforming runs were made for side by side comparison. In one run, the catalyst was a powdered platinum-alumina composite. In the other run, the catalyst was a mixture of the same powdered platinum-alumina composite and aluminum powder. Feed stock and operating conditions for both runs were identical. Details of the two runs and results obtained therefrom, which illustrate my invention, are described in further detail in the following paragraphs.

The platinum-alumina composite contained 0.56 percent by weight of platinum, and 0.62 percent by weight of chloride, supported on gamma/eta alumina containing about 9.1 percent by weight of volatiles. This platinum-alumina composite was crushed so that all passed 40 mesh ASTM sieve. The aluminum was a high purity aluminum metal powder, all of which passed 100 mesh ASTM sieve. To prepare the catalytic mixture of the present invention, the finely-divided aluminum powder was thoroughly mixed with the crushed platinum-alumina composite in a weight ratio of 1 to 1. The mixture was pelleted to ensure contact of the platinum-alumina composite and aluminum, and the pellets were then crushed to pass a 60 mesh ASTM sieve. Prior to the hydroforming runs, both the platinum-alumina composite and the catalytic mixture of the composite with aluminum was pre-reduced in hydrogen at about 1050° F. and atmospheric pressure for about 16 hours.

The hydroforming test unit was a ½" I. D. stainless steel tubular chamber, electrically-heated throughout its length to ensure essentially isothermal conditions. For each run 10 milliliters of the composite or catalytic mixture, as the case may be, were used to form a 2½" vertical catalyst bed. The catalyst bed was supported in each case by about 3 milliliters of inactive alpha alumina granules. About 80 milliliters of alpha alumina granules were also placed at the top of each catalyst bed as a preheat zone.

Feed stock for the two runs was methylcyclopentane and normal heptane in a molar ratio of 1 to 1. Use of such pure compounds made possible the ready analysis of various reactions involved and simplified the study of the product distribution. Prior to entering the reaction zone, the feed stock was passed through a calcium hydride guard chamber at about 575° F. and about 275 pounds per square inch gage to remove any contaminants, particularly water. Both runs were downflow and were made at a temperature of 900° F., a pressure of 275 pounds per square inch gage, a once-through hydrogen rate of 5000 standard cubic feet per barrel of charge, and a liquid hourly space velocity of 2.

From analysis of the products obtained and the operating conditions, catalyst activity was determined. Catalyst activity is a calculated value which measures the relative quantities, expressed as a percentage, of an arbitrarily-chosen reference catalyst required to produce a $C_5+$ product fraction having the same octane number under the same test conditions. The results obtained in the two tests are as follows:

| | 10 ml. of 0.56 Pt-Al$_2$O$_3$ Catalyst | 10 ml. of 1:1 Mixture of 0.56 Pt-Al$_2$O$_3$ and Aluminum |
|---|---|---|
| Catalyst Activity | 200 | 270 |
| Product Analysis, Vol. Percent: | | |
| Paraffins-Naphthenes | 58.5 | 52.5 |
| Olefins | 0.5 | 1.0 |
| Aromatics | 41.0 | 46.5 |
| Benzene/Toluene Ratio (Vol. Basis) | 0.5 | 2.2 |

The above results show that the catalytic mixture of platinum-alumina composite and aluminum is more active than the platinum-alumina composite itself even though only half the platinum is present. Furthermore, in the liquid product a higher concentration of aromatics was obtained, and the benzene toluene ratio was substantially increased.

While the catalytic mixture was used in powdered form in this example, it can also have been used in the form of pills, pellets and the like as described hereinabove. Because of the substantially greater heat conductivity of aluminum, as contrasted with alumina, substantially greater heat conductivity is achieved in the catalytic mixture than in the platinum-alumina composite by itself.

While I have described my invention with reference to certain specific embodiments thereof, it should be understood that such embodiments are illustrative only and not by way of limitation. Various modifications of my invention will be apparent from the foregoing description to those skilled in the art.

Having thus described my invention, I claim:

1. In a hydroforming process which comprises contacting a petroleum naphtha boiling between about 150 and 400° F. with a platinum-alumina composite, said composite having between about 0.01 and 1.0 percent by weight, based on dry $Al_2O_3$, of platinum, at a temperature of between about 800 and 1050° F., a pressure between about 100 and 1200 pounds per square inch, a hydrogen rate in the range of about 1000 and 10,000 standard cubic feet per barrel of said petroleum naphtha, an hourly weight space velocity between about 0.1 and 10, and collecting a hydroformate therefrom, the improvement which comprises mixing with said platinum-alumina composite between about 10 and 90 percent by weight, based on dry $Al_2O_3$, of free aluminum, whereby a higher ratio of benzene to toluene in said hydroformate is obtained.

2. A hydroforming process which comprises the steps of contacting a petroleum naphtha boiling in the range of about 150 and 400° F. with a catalytic mixture consisting essentially of alumina, between about 0.01 and 1 percent by weight, based on dry $Al_2O_3$, of platinum incorporated in said alumina, between about 0.1 and 10 percent by weight, based on dry $Al_2O_3$, of a cracking adjuvent incorporated in said alumina, and between about 10 to 90 percent by weight, based on dry $Al_2O_3$, of free aluminum admixed with said alumina, at a temperature in the range of about 800 to 1050° F., a pressure in the range of about 100 to 1200 pounds per square inch gage, a hydrogen rate in the range of about 1000 to 10,000 standard cubic feet per barrel of said petroleum naphtha, and a liquid hourly space velocity in the range of about 0.1 and 10, and withdrawing a hydroformate therefrom, whereby a high ratio of aromatics to other components in said hydroformate is obtained.

References Cited in the file of this patent

UNITED STATES PATENTS

| | | |
|---|---|---|
| 2,039,259 | Pier et al. | Apr. 28, 1936 |
| 2,799,626 | Johnson et al. | July 16, 1957 |